P. J. KNAUS.
APPARATUS FOR VULCANIZING ARTICLES OF RUBBER OR RUBBERIZED FABRIC.
APPLICATION FILED JAN. 15, 1919.
1,422,209.
Patented July 11, 1922.
3 SHEETS—SHEET 1.
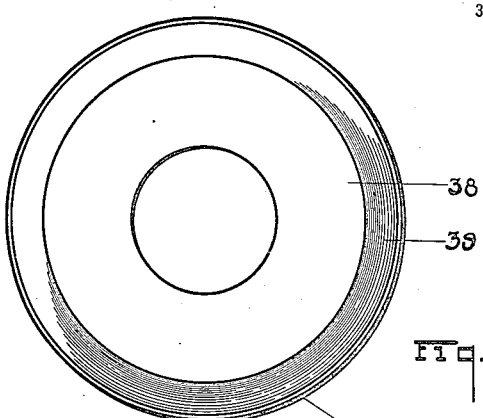
FIG. I.
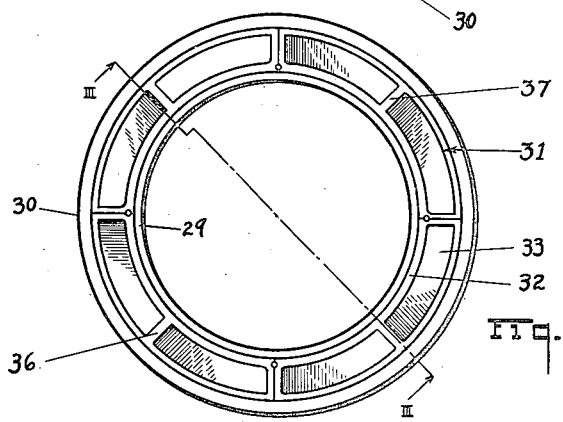
FIG. II.
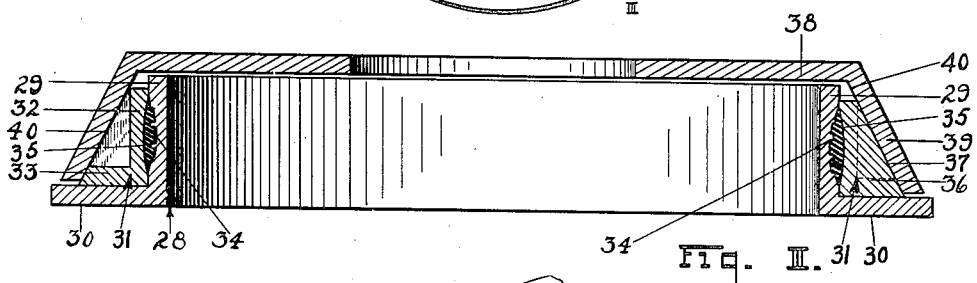
FIG. III.
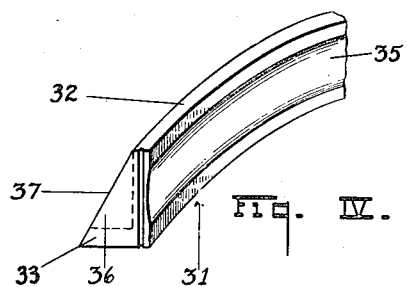
FIG. IV.
INVENTOR.
Peter J. Knaus
BY Chester H Bruelton
ATTORNEY

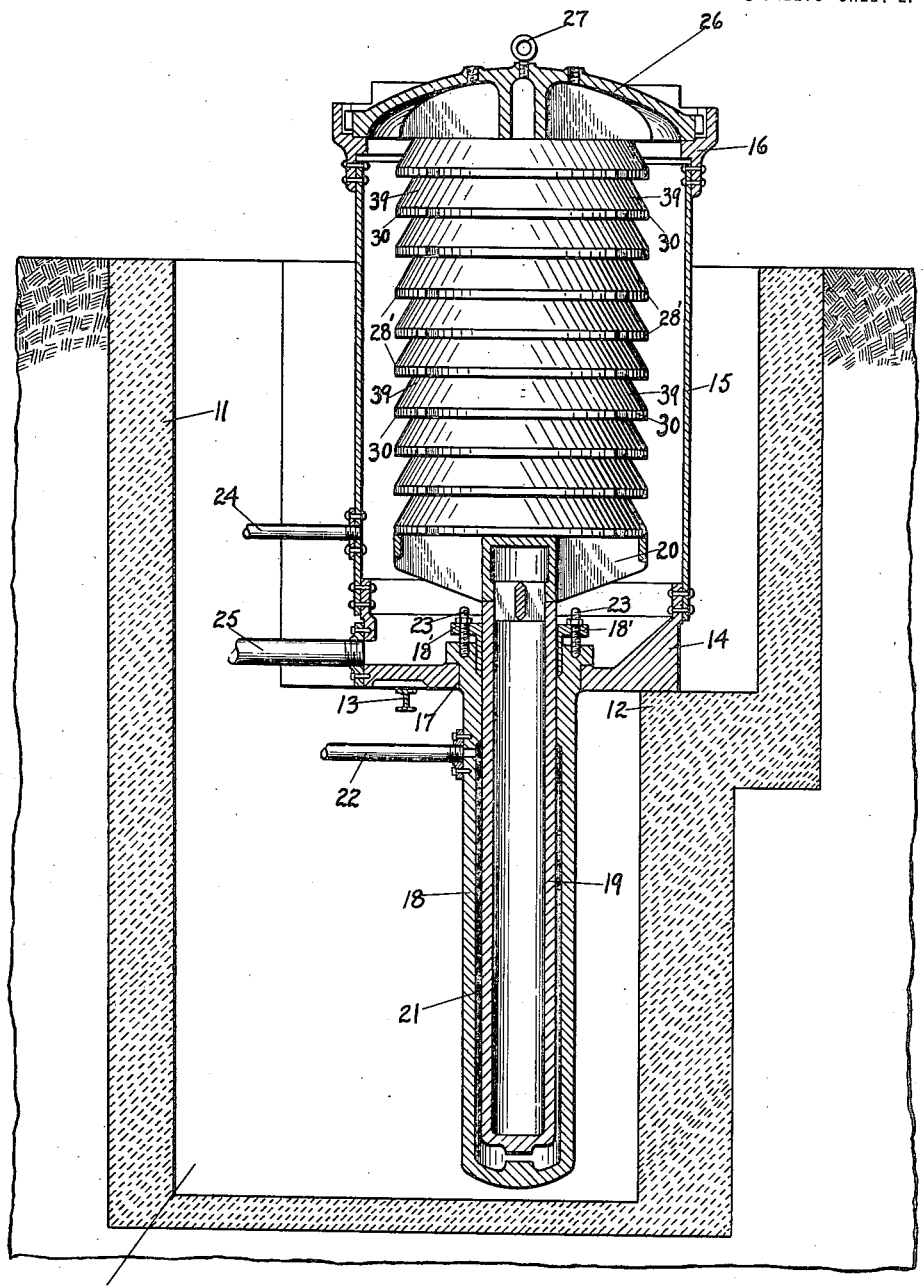

P. J. KNAUS.
APPARATUS FOR VULCANIZING ARTICLES OF RUBBER OR RUBBERIZED FABRIC.
APPLICATION FILED JAN. 15, 1919.
1,422,209.
Patented July 11, 1922.
3 SHEETS—SHEET 3.
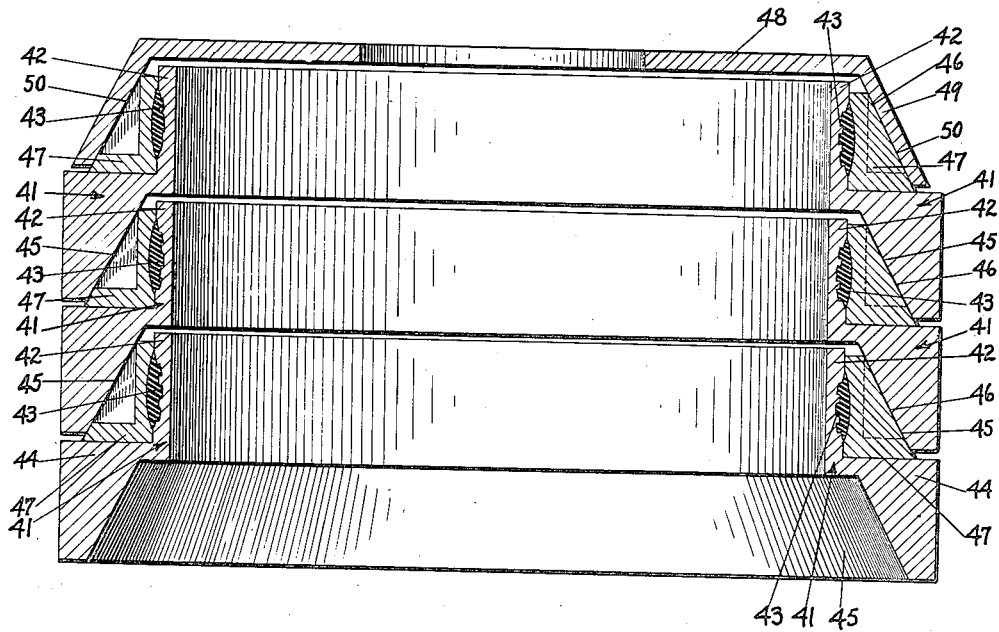
Fig. VI.
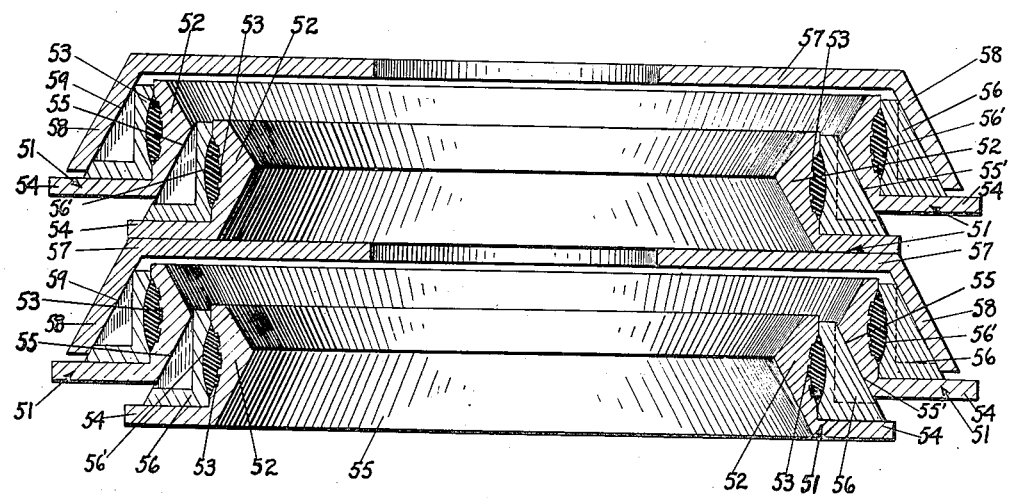
Fig. VII.
INVENTOR.
Peter J. Knaus
BY Chester H Broselton
ATTORNEY.

UNITED STATES PATENT OFFICE.

PETER J. KNAUS, OF MILWAUKEE, WISCONSIN, ASSIGNOR, BY MESNE ASSIGNMENTS, TO THE FISK RUBBER COMPANY, OF CHICOPEE FALLS, MASSACHUSETTS, A CORPORATION OF MASSACHUSETTS.

APPARATUS FOR VULCANIZING ARTICLES OF RUBBER OR RUBBERIZED FABRIC.

1,422,209. Specification of Letters Patent. Patented July 11, 1922.

Application filed January 15, 1919. Serial No. 271,214.

*To all whom it may concern:*

Be it known that I, PETER J. KNAUS, residing at Milwaukee, county of Milwaukee, and State of Wisconsin, have invented certain new and useful Improvements in Apparatus for Vulcanizing Articles of Rubber or Rubberized Fabric, of which I declare the following to be a full, clear, and exact description.

This invention relates to an apparatus for vulcanizing articles of rubber or rubberized fabric, particularly articles of rubber having a circular band shape such as tire treads for pneumatic tires.

One object of this invention is to provide an apparatus of this character, wherein a plurality of articles may be treated at one and the same operation.

A further object of this invention is to provide suitable means for simultaneously exerting pressure upon a plurality of articles to be treated during the process of vulcanization.

A further object of this invention is to provide means for automatically centering the various mold units with respect to each other in the vulcanizing chamber.

A further object of this invention is to provide means for exerting a substantially equal pressure upon each of the various articles to be treated during the process of their vulcanization.

Further objects of this invention relate to economies of manufacture and details of construction, as will hereinafter appear from the detailed description to follow.

The objects of the invention are accomplished in one instance by the devices and means described in the following specification, but it is evident that the same may be varied widely without departing from the scope of the invention, as pointed out in the appended claims.

A structure constituting one embodiment of the invention, which may be the preferred, is illustrated in the accompanying drawing forming a part hereof, in which:

Fig. I is a top-plan view of one of the mold units.

Fig. II is a top-plan view of one of the mold units with the upper annular member removed to better show the form of the segmental members.

Fig. III is a vertical-sectional view of one of the mold units, taken through that portion of the parts as indicated by line III—III of Fig II.

Fig. IV is a detail perspective view of one of the segmental members.

Fig. V is a vertical-sectional view of the vulcanizing chamber, showing a plurality of mold units arranged in operative position therein.

Fig. VI is a vertical-sectional view showing a modified form of mold units, and their position relative to each other when assembled in the vulcanizing chamber.

Fig. VII is a vertical-sectional view of another modified form of mold units, showing their position with respect to each other when assembled for treatment in the vulcanizing chamber.

The pressure necessary in shaping and vulcanizing articles of rubber having a circular band shape has heretofore been obtained with fabric and wire wrappers. This method has been found to be objectionable in that the pressure obtained was insufficient and unreliable. It has been found that the wrappers would loosen in the handling of the heavy iron drum on which the rubber articles were set up, with the result that the treated product would be defective. By the use of the means shown and described herein, a sufficient and reliable pressure means is employed during the vulcanizing so as to produce a perfect article.

In the drawings, similar reference characters refer to corresponding parts throughout the several views.

In the drawings 10 indicates the vulcanizing pit provided with a retaining wall 11 having a shelf 12 for the purpose of assisting in supporting the vulcanizing chamber. A beam 13 is mounted in any suitable manner within the pit and together with the shelf 12 supports the vulcanizing chamber and its associating parts in proper position. The vulcanizing chamber comprises a base portion 14, a cylindrical body portion 15, and a top portion 16; these several parts being firmly secured together by rivets passed through the adjacent edges of the meeting parts so as to form tight joints capable of withstanding considerable pressure. An opening 17 is provided in the base portion of the chamber for the reception of the cylinder 18 of a hydraulic press containing a plunger 19 having a large flat-topped head 20. The lower portion of the cylinder 18 is provided with an enlarged portion 21 communicating with the opening of a pipe 22, for the purpose of communicating hydraulic pressure to the lower end of the plunger. The upper part of the cylinder 18 is provided with a packing ring 18' secured in position thereon by bolts 23, and adapted to secure a tight connection between the plunger and the cylinder. A steam inlet pipe 24 and a water outlet pipe 25 communicates with the vulcanizing chamber in a suitable manner, as shown in Fig. V. A cover 26 is adapted to rest upon the top portion 16 of the vulcanizing chamber, and to be firmly secured thereon by any suitable means (not shown) in such a manner as to hermetically close the vulcanizing chamber. 27 is an eye by which power of raising devices may be attached to the cover for the purpose of conveniently raising and lowering the same. A plurality of mold units 28' are shown arranged in superposed position upon the enlarged head 20 of the plunger; the top surface of the upper unit bearing against the lower surface of the cover member, so that the parts of which the several units are made up will be pressed closely together upon an upward movement of the plunger head.

It will be readily understood that the manner of forming the joints between the base portion 14, the cylindrical portion 15, and the top portion 16 of the vulcanizing chamber is such as to provide a structure which may be subjected to a considerable degree of steam pressure without the liability of any leaks taking place, or of the danger that any of the parts will be separated by reason of the pressure exerted. In a similar manner the connection between the pipes 24 and 25 and the vulcanizing chamber, as well as the connection between the pipe 22 and the pressure cylinders are so constructed as to be capable of withstanding a considerable degree of pressure. When a sufficient number of articles to be vulcanized have been prepared and the several parts of the mold units properly assembled with relation to each other, the various mold units thus assembled, each carrying an article to be vulcanized, are adapted to be placed in a superposed position upon the enlarged head 20 of the plunger and the cover 26 of the vulcanizing chamber properly positioned upon the top member 16 of the chamber and firmly secured in place thereon. Hydraulic pressure may then be admitted through the pipe 22 to the cylinder 18 whereupon the plunger 19 will be forced upwardly carrying with it the enlarged head 20, and exerting pressure upon the several mold units to force the several parts thereof into closer relation with each other, and a desired degree of steam pressure may be admitted to the vulcanizing chamber through the pipe 24, while the pipe 25 serves as an outlet for the water formed in the vulcanizing chamber by reason of the condensation of the steam.

It will, of course, be understood that the hydraulic pressure admitted to the pressure cylinder 18 through the pipe 22 and the steam pressure admitted to the vulcanizing chamber through the pipe 24 may be varied as desired either with respect to the time of their application relative to each other or with respect to the intensity of the pressure employed.

The mold units shown in Figs. I to IV inclusive, each comprise a base member 28 provided with an annular portion 29 and an outwardly extending flange portion 30. A plurality of segmental members 31, each being provided with an annular portion 32 and an outwardly extending flange portion 33 are adapted to rest upon the outwardly extending flange portion 30 of the base member, when in operative position, and have the several annular portions 32 positioned in proximity to the annular portion 29 of the base member. The annular portion 29 of the base member is provided upon its outer circumferential face with a recess 34, which may be so constructed as to impress a design upon the surface of the material to be treated. In a similar manner, the inner circumferential faces of the various segmental members may be provided with recesses 35, adapted when the segmental members are properly arranged in position relative to the base member, to register with the corresponding recess 34 formed upon the outer circumferential face of the annular portion of the base member. Each of the various segmental members are provided with a plurality of inclined portions 36 forming outwardly extending inclined surfaces 37 upon the exterior faces of said segmental members. An annular cover member 38 is provided with a downwardly extending circumferential flange 39 formed in such a manner as to provide an inner inclined surface 40 for co-operation with the outer inclined surfaces 37 of the various segmental members. It will be readily apparent that when a circular strip of rubberized fabric, such as a tire tread, has been positioned upon the annular portion of the base member in such a manner as to rest against the recessed portion thereof, and the various segmental members placed in operative position, their various upright portions 32 lying in proximity to the annular portion 29 of the base member, and the annular member 38 positioned in such a manner that its inner inclined surface will cooperate with the outer inclined surfaces of the various segmental members, vertical pressure exerted upon the members 38 and 28 tending to move those members toward each other will, by reason of the inclined mating surfaces, exert a pressure on the elements 28 and 31 in a direction radially thereof, and a consequent radial pressure upon the material to be vulcanized. The amount of the radial pressure exerted upon the rubberized fabric during the process of its vulcanization may be regulated by exerting a greater or less vertical pressure upon the parts 28 and 31 through the pressure means illustrated in Fig. V.

It will be apparent that by reason of this construction a constant pressure of any desired intensity may be maintained upon the material to be treated, and from the construction and arrangements of the parts, this pressure will not be liable to any unwarranted reduction, and will be maintained to a substantially equal degree upon all of the parts of the article to be treated.

In the modified form of mold units illustrated in Fig. VI, means is employed for centering these various units with respect to each other, and the employment of the annular top member is dispensed with, except in connection with the upper mold unit. Each base member 41 is provided with an upwardly extending annular portion 42 provided upon its outer circumferential face with a recess 43, the construction of the annular portion 42 and the manner of forming the recess therein being in all respects similar to that employed in the preferred form shown in Figs. I to IV inclusive. The outwardly extending flange portion 44 of the base member is extended downwardly and provided with an inner inclined surface 45 formed of such a size as to be adapted to cooperate with the inclined outer surface 46 of the various segmental members 47. A single annular cover member 48 may be employed, which is provided with a downturned circumferential portion 49, provided with an inner inclined surface 50. By reason of the fact that the inner inclined surface 45 formed in the flange portion 44 of each base member is adapted to cooperate with the inclined outer surfaces of the segmental members of each unit, except the top unit, for the purpose of exerting pressure thereon, it is necessary to employ an annular cover member only for the top unit. It will be understood that this form provides a positive means for centering the several units with respect to each other as well as providing a certain and uniformly operating means for communicating the vertical pressure exerted upon the several units so that such pressure will be exerted in a direction radially of the segmental members, and the rubberized fabric to be treated. It will be further noted, that in this form of a device the various units employed are adapted to receive and operate upon articles of rubberized fabric which are of substantially equal size.

In the modified form shown in Fig. VII, a plurality of units adapted to accommodate articles of different sizes are employed. The base member 51 of each unit is provided with an upwardly extending annular portion 52 having a recess 53 formed upon its outer circumferential face, similar to those shown in the other forms. Each base member is also provided with an outwardly extending flanged portion 54, and there is formed upon the inner surface of the upwardly extending annular portion of the base member an inner inclined surface 55. By reason of the manner of forming this inner inclined surface, articles of rubberized fabric of different sizes may be treated together by arranging the units in pairs, the units carrying the smaller articles being made the lower unit of each pair, and the inner inclined surface formed in the base member of the upper unit co-operating with the inclined outer surfaces 55' of the various segmental members of the lower unit for centering the two units relative to each other, and exerting radial pressure upon the part of the lower unit and the articles contained therein. The segmental members employed in this form may be constructed in a manner similar to those shown in the other forms and are designated here by the numeral 56, and each shown as provided with a recess 56' formed upon its inner circumferential face in a manner similar to that shown in the other forms. An annular cover member 57 is preferably employed with each pair of mold units, the said cover members being provided with a downwardly inclined surface 59 adapted to co-operate with the outer inclined surface of the several segmental members of the upper unit of each pair. It will be noted that in the use of this construction, the two units of each pair employ but slightly more vertical space than that necessary for a single unit. The annular cover member of each pair is adapted to provide a base for the support of the lower unit of the next succeeding pair, and the manner of arranging the inclined surfaces of the several units is such as to provide a centering means for centering the units of each pair relatively to each other, as well as providing an effective means for communicating pressure upon the articles to be treated in a direction radially thereof.

When articles of rubberized fabric have been prepared for vulcanization, each article is placed in position upon the outer circumferential face of the annular portion of one of the base members in such a manner that it will lie within the recess formed upon that member, and the various segmental members necessary to make up an operative unit are placed in position so that the lower flanged portions thereof seat upon the flanged portion of the base members, and the recesses formed in the inner circumferential faces of the various segmental members engage the outer surface of the fabric strip and register with the recesses formed in the base member. In the forms shown in Figs. I to IV inclusive, the annular cover member is then placed in position upon the segmental members. When a sufficient number of mold units have thus been assembled, they are placed in a vulcanizing chamber in such a manner that the lower unit rests upon the enlarged head of the plunger, and the flanged portion of the base member of each succeeding unit rests upon the cover member of the unit next below. When a sufficient number of mold units have thus been placed in position in the vulcanizing chamber, the cover is placed thereon and firmly secured in position. Pressure may then be communicated to the plunger, and steam admitted to the vulcanizing chamber in whatever order and at whatever degree of intensity may be deemed desirable for the proper treatment of the fabric. As pressure is communicated to the plunger, the plunger is raised in the cylinder thereby raising the enlarged portion and communicating a substantially uniform pressure to each of the mold units in a vertical direction. The inclined mating surfaces on the segmental members and the annular cover member, of each unit, results in communicating a portion of the vertical pressure in a direction radially of the annular portion of the base member, and of the strip or fabric to be treated.

With the form of mold unit illustrated in Fig. VI, the annular cover plate may be dispensed with except in connection with the top unit of the series, and the manner of constructing the unit enables the vertical pressure to be communicated uniformly to each unit in a direction radially of the annular portion of the base members and of the material to be treated. In this construction, the manner of forming the parts provides a ready and efficient means for centering the various units with respect to each other, thus insuring a constant and equal transmission of the pressure to each unit during the process of vulcanization.

In the form shown in Fig. VII, the units are preferably arranged in pairs and means is provided for centering the two units of each pair with respect to each other. This construction makes it possible to treat a great number of units at the same time, since the units occupy less vertical space than in the other forms. An annular cover member is preferably employed with each pair of mold units as shown in this construction This construction permits of readily treating articles of different size together and vulcanizing them at one operation.

While I have shown and described in considerable detail a specific embodiment of my invention, it is to be understood that this showing and description is illustrative only, and for the purpose of rendering my invention more clear, and that I do not regard the invention as limited to the details of construction illustrated or described, nor any of them, except in so far as I have included such limitations within the terms of the following claims, in which it is my intention to claim all novelty inherent in my invention broadly as well as specifically.

What I claim as new and desire to secure by Letters Patent is:

1. In an apparatus of the class described, a vulcanizing chamber, a plurality of units, the parts of adjacent units being provided with inclined mating surfaces and forming molds for the reception of tire treads, means for simultaneously exerting pressure upon the units whereby radial pressure is communicated to the several treads during the process of vulcanization.

2. In an apparatus of the class described, a vulcanizing chamber, a plurality of mold units, parts of adjacent units being provided with inclined mating surfaces, means for exerting vertical pressure upon the mold units, and means including said inclined mating surfaces whereby a part of the vertical pressure is transmitted to the parts of the mold units in a direction radially thereof.

3. In an apparatus of the class described, a vulcanizing chamber, a plurality of mold units, parts of which are provided with inclined mating surfaces for transmitting vertical pressure to the said parts in a direction radially thereof and centering the various units with respect to each other, and means for exerting vertical pressure upon the units.

4. In an apparatus of the class described, a vulcanizing chamber, a plurality of mold units, means unitary with said mold units for centering said units with respect to each other, and means for exerting pressure upon the several units.

5. In an apparatus of the class described, a vulcanizing chamber, a plurality of mold units, means unitary with said mold units for centering said units with respect to each other, and means for simultaneously exerting pressure upon the several units.

6. In an apparatus of the class described, a vulcanizing chamber, a plurality of mold units, parts of which are provided with inclined mating surfaces, means including said inclined surfaces for centering the units with respect to each other, and means for exerting pressure upon the several units.

7. A mold unit comprising a flanged base, a plurality of segmental members each provided with an inclined surface, and means comprising an annular member provided with an inclined inner surface for forcing the segmental members towards the base member in a direction radially of the base member.

8. A mold unit comprising a base member having an annular portion provided with a recess formed in its outer circumferential face, a plurality of segmental members each of which is provided with a recess on its inner face adapted to register with the recess formed in the outer face of the base portion, and having inclined outer surfaces, and means comprising an annular member provided with an inclined inner surface for cooperation with the inclined surfaces of the segmental members for forcing the segmental members towards the annular portion of the base member.

9. A mold unit comprising a base member having an annular portion and an outwardly extending flanged portion, a plurality of segmental members each of which is provided with an inclined outer surface, and an annular member provided with an inclined inner surface for co-operation with the inclined surfaces of the segmental members.

10. A mold unit comprising a base member having an annular portion and an outwardly extending flanged portion provided with an inner inclined surface, a plurality of segmental members each of which is provided with an inclined outer surface, and an annular member provided with an inclined inner surface for co-operation with the inclined surfaces of the segmental members.

11. In an apparatus of the class described, a plurality of mold units comprising base members each having an annular portion, and an outwardly extending flanged portion provided with an inner inclined surface, a plurality of segmental members each of which is provided with an inclined outer surface, each of said base members except the lowest having its inner inclined surface resting upon the inclined outer surfaces of the segmental members forming a part of the next lower unit, and a member provided with an inclined inner surface resting upon the inclined outer surfaces of the segmental members forming a part of the upper unit.

12. In an apparatus of the class described, a plurality of superposed mold units, each comprising a base member having an annular portion and an outwardly extending flanged portion provided with an inner inclined surface, a plurality of segmental members each provided with outwardly inclined surfaces, the inner inclined surfaces of the outwardly extending flanged portions of the upper base members resting upon the outwardly inclined surfaces of the segmental members forming a part of each of the next lower units.

13. In an apparatus of the class described, a plurality of superposed mold units, each comprising a base member having an annular portion, and an outwardly extending flanged portion provided with an inclined surface, the annular portions of said base members being of substantially equal diameter; a plurality of segmental members, each provided with outwardly inclined surfaces, the inner inclined surfaces of the outwardly extending flanged portions of each upper unit resting upon the outwardly inclined surfaces of the segmental members forming a part of each of the next lower units.

14. In an apparatus of the class described, a plurality of superposed mold units, the alternate molds being of different size from the intermediate molds, and the parts of adjacent molds being formed with inclined mating surfaces for centering the molds of each pair with respect to each other.

15. In an apparatus of the class described, a plurality of superposed mold units arranged in pairs, the two molds comprising each pair being formed with inclined meeting surfaces for centering the molds of each pair with respect to each other, and for communicating pressure to the parts in a direction radially thereof, when vertical pressure is applied to the molds.

16. In an apparatus of the class described, a plurality of superposed mold units arranged in pairs, the molds of each pair being of different size, and an annular member forming a part of the upper mold unit of each pair adapted to form a seat for the next succeeding mold units.

„In testimony whereof, I affix my signature.

PETER J. KNAUS.